United States Patent [19]

Tachikawa

[11] Patent Number: 4,903,313

[45] Date of Patent: Feb. 20, 1990

[54] CHARACTER RECOGNITION METHOD

[75] Inventor: Michiyoshi Tachikawa, Tokyo, Japan

[73] Assignee: Ricoh Company, Ltd., Japan

[21] Appl. No.: 69,303

[22] Filed: Jul. 2, 1987

[30] Foreign Application Priority Data

Jul. 3, 1986 [JP] Japan .................................. 61-156838
Jul. 8, 1986 [JP] Japan .................................. 61-160647

[51] Int. Cl.$^4$ ............................................. G06K 9/56
[52] U.S. Cl. ......................................... 382/27; 382/9; 382/18; 382/19
[58] Field of Search ................... 382/27, 22, 16, 9, 21, 382/10, 19, 18

[56] References Cited

U.S. PATENT DOCUMENTS

| | | | |
|---|---|---|---|
| 3,936,800 | 2/1976 | Ejiri et al. | 382/27 |
| 4,288,779 | 9/1981 | Otsu et al. | 382/27 |
| 4,525,859 | 6/1985 | Bowles et al. | 382/27 |
| 4,700,400 | 10/1987 | Ross | 352/27 |
| 4,723,298 | 2/1988 | Schiller | 382/27 |
| 4,741,046 | 4/1988 | Matsunawa et al. | 382/9 |
| 4,757,551 | 7/1988 | Kobayashi et al. | 382/18 |

Primary Examiner—Leo H. Boudreau
Assistant Examiner—Joseph Mancuso
Attorney, Agent, or Firm—Mason, Fenwick & Lawrence

[57] ABSTRACT

A character recognition method includes a step of assigning one of a plurality of predetermined directionality codes to each of the pixels defining the contour of a character pattern. Then, the character pattern, to which the directionality codes have been assigned, is subdivided into a plurality of mesh regions. In this case, in accordance with the present invention, the character pattern is not directly subdivided into mesh regions, and, instead, the character pattern is first subdivided into a first plurality of sub-regions and then the first plurality of sub-regions are converted into a second plurality, which is smaller in number than the first plurality, of mesh regions by combining at least some of said first plurality of sub-regions. Such a two-step subdivision process of a character pattern is advantageous in absorbing fluctuations caused by modifications of the character pattern, such as hand-written characters.

6 Claims, 17 Drawing Sheets

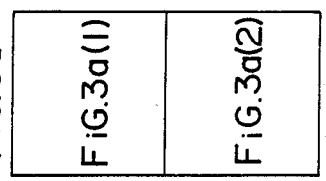
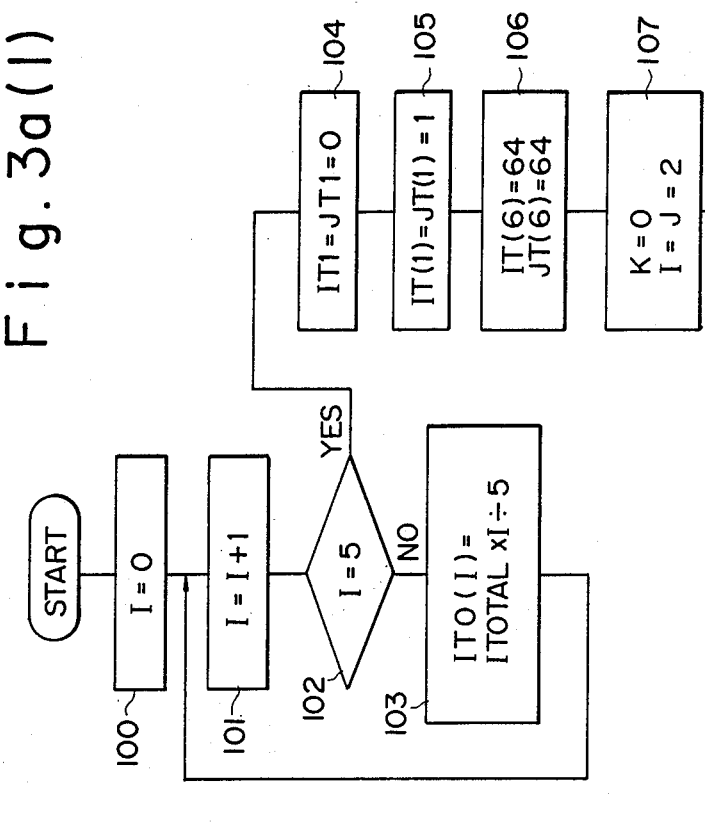

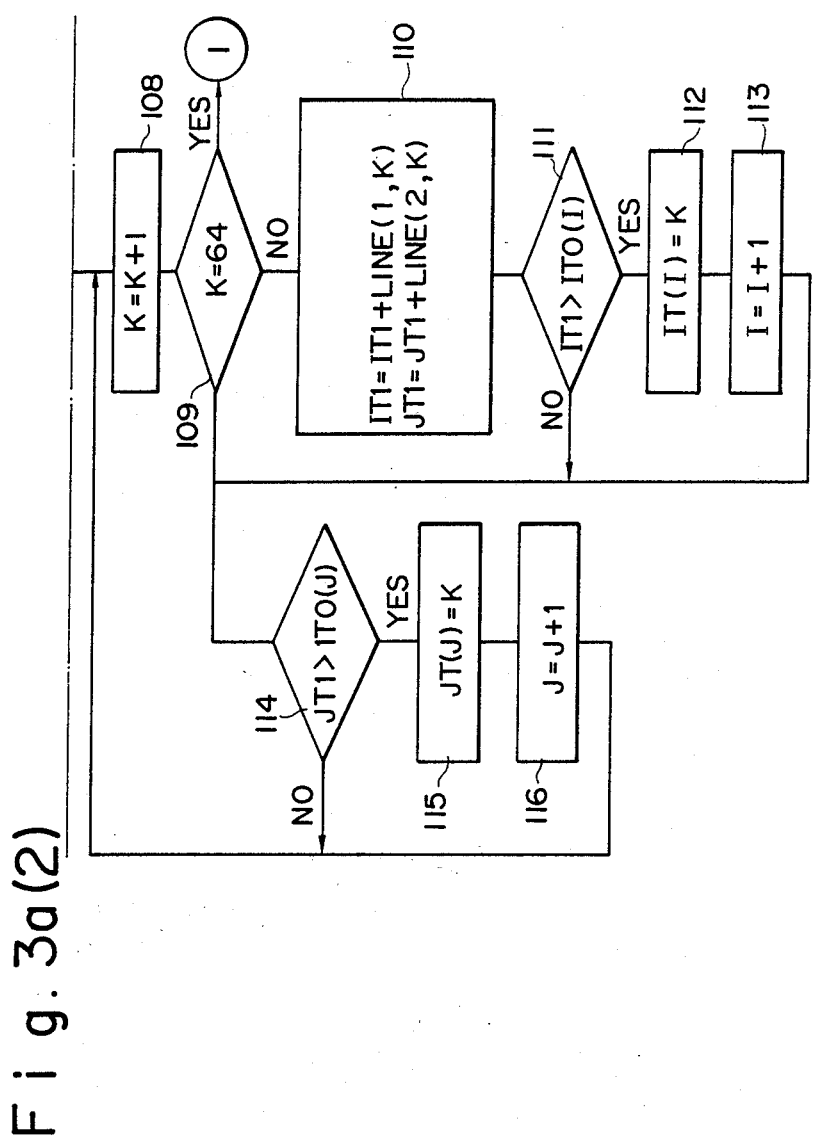
Fig. 3a(2)

Fig. 8

| DIRECTIONALITY CODE | 0 | 1 | 2 | 3 | 4 | 5 | 6 | 7 |
|---|---|---|---|---|---|---|---|---|
| PATTERN | ○○○<br>○○○<br>○○○ | ○○●<br>○○○<br>○○○ | ●○○<br>○○○<br>○○○ | ○○○<br>●○○<br>○○○ | ○○○<br>○○●<br>○○○ | ●○○<br>●○○<br>○○○ | ●○○<br>●○○<br>○○○ | ○○●<br>○○●<br>○○○ |

| DIRECTIONALITY CODE | 8 | 9 | 9 | 9 | 9 | 9 | 9 | 9 |
|---|---|---|---|---|---|---|---|---|
| PATTERN | ○○○<br>●○○<br>○○● | ○○●<br>●○○<br>●○○ | ●○○<br>○○○<br>●○● | ●○○<br>●○○<br>●○○ | ○○●<br>●○○<br>●○● | ○○●<br>○○●<br>●○● | ●○●<br>○○○<br>●○● | ●○●<br>○○○<br>●○● |

CHARACTER RECOGNITION METHOD

BACKGROUND OF THE INVENTION

1. Field of the Invention

This invention generally relates to a pattern recognition method and system, and, in particular, to a character recognition method and system for recognizing unknown, input characters by comparing with registered, known characters. More specifically, the present invention relates to a character subdividing method suitable for use in a character recognition method and system. Furthermore, the present invention relates to a character recognition method using a multi-layer directionality code histogram technique.

2. Description of the Prior Art

A character recognition method including a step of subdividing a character pattern into a plurality of mesh regions and a step of collectively processing feature quantities of the character pattern for each of the mesh regions is well known. However, in the case where subdividing points for subdividing the character pattern into mesh regions, it is prone to deformations of a character pattern so that the rate of recognition using fixed subdividing points for such characters as hand-written kanji (Chinese) characters tends to be significantly deteriorated. In order to prevent the rate of recognition from being deteriorated by deformations of character patterns, there has been proposed a character pattern subdividing method using variable subdividing points as disclosed, for example, in the Japanese Patent Application No. 59-202823 assigned to the assignee of this application. In accordance with this method using variable subdividing points, the subdividing points for subdividing a character pattern into mesh regions are variably determined such that predetermined feature quantities of the character pattern are equally distributed among the subdivided mesh regions.

Furthermore, there is another Japanese Patent Application No. 59-202825 which has also been assigned to the assignee of this application and which discloses a character recognition method employing such a variable character pattern subdividing method and collectively processing the feature quantities of the character pattern for each of the subdivided mesh regions. With this variable character pattern subdividing method, the rate of character recognition can be less affected by modifications of character patterns as compared with the fixed subdividing method, so that there is obtained an increased rate of recognition for hand-written characters or the like. However, with the above-described character pattern recognition method, the adjacent subdivided mesh regions do not overlap each other or even if they do overlap, an overlapping width remains constant. As a result, depending on the manner and degree of deformations of a character pattern, there is a case in which the fluctuations of feature quantities due to deformations of a character pattern cannot be absorbed sufficiently.

SUMMARY OF THE INVENTION

In accordance with a first aspect of the present invention, there is provided a method for subdividing a character pattern in which a character region in which a character pattern is defined is first subdivided into a first plurality of sub-regions such that predetermined feature quantities are distributed among the sub-regions substantially equally and then at least some of the first plurality of sub-regions are combined to thereby convert the first plurality of sub-regions into a second plurality of mesh regions, thereby subdividing the character region into the mesh regions. Preferably, when combining at least some of the sub-regions, two or more adjacent sub-regions are combined into one mesh region. In addition, at least some of the mesh regions have an overlapping section which is defined by a common sub-region combined into two adjacent sub-regions adjacent to the common sub-region.

In accordance with another aspect of the present invention, there is provided a character pattern subdividing method for use in a character recognition method comprising the steps of: assigning a plurality of predetermined directionality codes to the contour pixels defining a character pattern in a character region; subdividing the character region into a first plurality of sub-regions such that the assigned directionality codes are distributed among the first plurality of sub-regions substantially uniformly; combining at least some of said first plurality of sub-regions according to a predetermined manner to thereby convert the first plurality of sub-regions into a second plurality of mesh regions. Preferably, the first plurality is larger in number than the second plurality. In the preferred embodiment of this aspect of the present invention, the character recognition method uses the so-called multi-layer directionality code histogram method.

It is therefore a primary object of the present invention to obviate the disadvantages of the prior art as described above and to provide an improved character pattern subdividing method.

A further object of the present invention is to provide a character recognition method and system using an improved character pattern subdividing method.

A still further object of the present invention is to provide an improved character pattern subdividing method and system suitable for processing deformed characters, such as hand-written characters.

A still further object of the present invention is to provide an improved character recognition method and system which is least adversely affected by deformations of a character pattern.

A still further object of the present invention is to provide an improved character pattern subdividing method capable of maintaining a high recognition rate irrespective of the conditions of a character pattern to be processed when used in a character recognition system.

Other objects, advantages and novel features of the present invention will become apparent from the following detailed description of the invention when considered in conjunction with the accompanying drawings.

BRIEF DESCRIPTION OF THE DRAWINGS

FIGS. 3a(1), 3a(2) and 3b define a flow chart showing a sequence of steps for implementing the character pattern subdividing method illustrated in FIGS. 1a and 1b;

FIG. 8 is a schematic illustration showing a table which defines a plurality of directionality codes and its associated pixel pattern with the central pixel being a pixel of interest suitable for use in the system of FIG. 6.

DESCRIPTION OF THE PREFERRED EMBODIMENTS

At the outset, it is to be noted that the term "character" used in the present specification includes the meaning of similar terms, such as "letter", "symbol" and "numeral".

Figure 2:
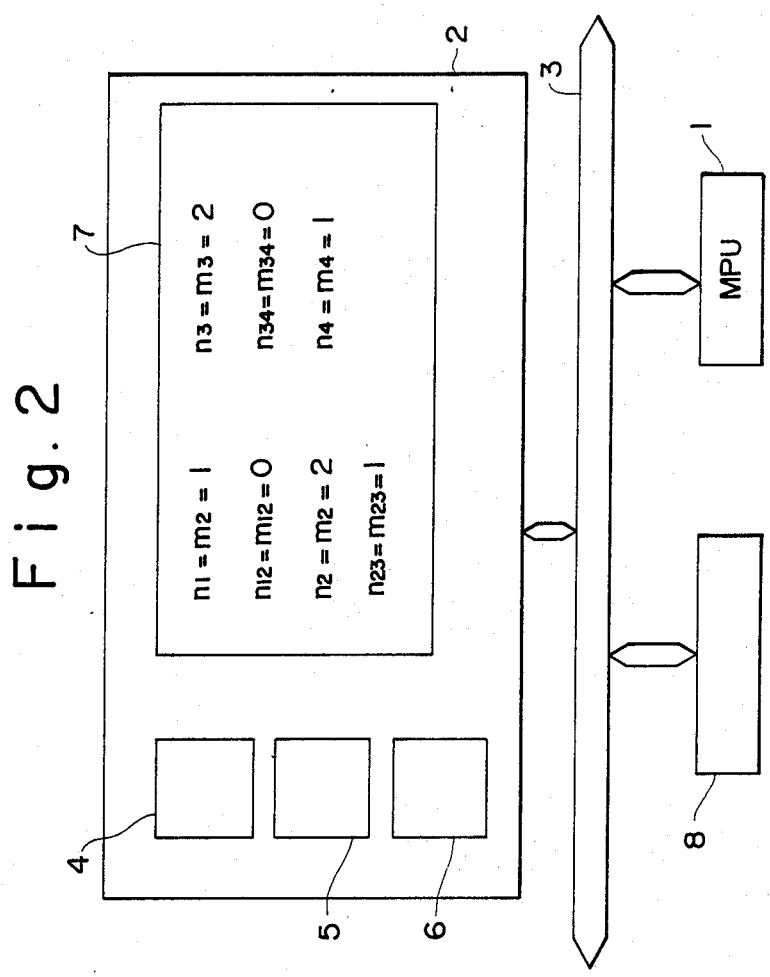
FIG. 2 is a block diagram showing a character pattern subdividing system constructed in accordance with one embodiment of the present invention to implement a character subdividing process as illustrated in FIGS. 1a and 1b.

Referring first to FIG. 2, there is shown in block form a character pattern subdividing system constructed in accordance with one embodiment of the present invention. As shown, the present character patter subdividing system includes a microprocessor 1 and a memory 2 for storing programs and data, which is connected to the microprocessor 1 via a bus 3. Also provided in the system is a character pattern input unit 8 which is also connected to the bus 3. Thus, a character pattern input from the input unit 8 is stored into a character buffer 4 defined in the memory 2 through the microprocessor 1. The microprocessor 1 carries out a directionality code assignment task so that predetermined 8 different kinds of directionality codes are assigned to the contour pixels of a character line defining the character pattern in accordance with a predetermined manner and the character pattern having directionality codes assigned to its contour is stored in the character buffer 4. One example of such directionality codes and a step of assigning such directionality codes to the contour pixels of a character pattern will be described later. In this case, the total number ITOTAL of the assigned directionality codes is counted and its count is stored at a particular address of the memory 2. In the memory 2 are also defined a sub-region table 5, an allotment table 6 and a mesh region table 7.

Figure 1A:
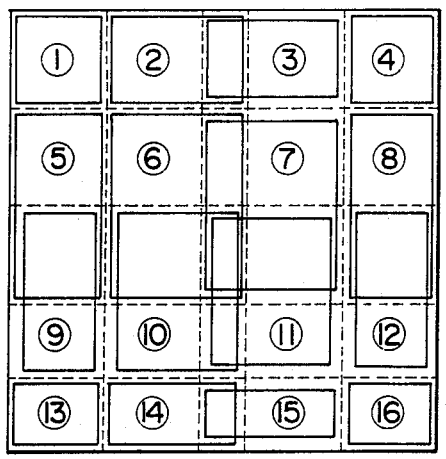
FIGS. 1a and 1b are illustrations showing how a character region is first subdivided into sub-regions and then converted into mesh regions in accordance with one embodiment of the present invention.

Now, with reference to FIGS. 1a and 1b, a character pattern subdividing process according to one embodiment of the present invention will be described below. Initially, in accordance with a first subdivision scheme, to the contour of a character pattern (here, it will be assumed a pattern comprised of 64 pixels in row and 64 pixels in column) is assigned a plurality of predetermined directionality codes (feature quantities) as set forth above and stored in the buffer 4. Then, the character pattern is subdivided into a plurality of sub-regions by dividing the character pattern into five sections horizontally and also into five sections vertically such that the assigned directionality codes are distributed among the subdivided sub-regions substantially uniformly. More specifically, the character pattern is divided into five horizontal sections such that each horizontal section includes the number of assigned directionality codes determined by dividing ITOTAL by five, and similarly, the character pattern is also divided into five vertical sections such that each vertical section has substantially the same number of directionality codes.

Figure 1B:
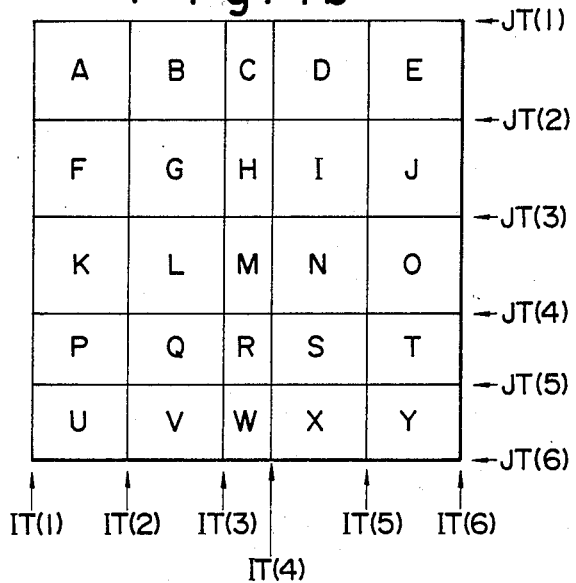

In FIG. 1b, IT(2) through IT(5) indicate the coordinate positions along the horizontal axis for subdividing the character pattern into five horizontal sections, and JT(2) through JT(5) indicate the coordinate positions along the vertical axis for subdividing the character pattern into five vertical sections In this manner, by dividing the character pattern into five horizontal sections as well as into five vertical sections, there are obtained a first plurality (five times five = twenty five) of sub-regions A through Y as indicated in FIG. 1b. It is to be noted that there holds the relation of $IT(1)=JT(1)=1$ and $IT(6)=JT(6)=64$ which is stored in the sub-region table 5 together with the coordinates of the other subdividing positions.

Then, in accordance with a second subdivision scheme, designated sub-regions are allotted to each mesh region in accordance with allotment designation information stored in the allotment table 6, thereby combining the sub-regions in a designated manner, so that the first plurality of sub-regions are converted into a second plurality (four time four in the illustrated example), which is smaller in number than the first plurality, of mesh regions. In other words, at least some of the sub-regions are combined to define a mesh region, thereby forming a second plurality of mesh regions across the entire area of the character pattern. In the illustrated embodiment, since the contents of the allotment designation information correspond to data stored in the allotment table 6, the character pattern is finally subdivided into a second plurality of mesh regions 1 through 16 as indicated in FIG. 1a.

The combination of integration of two or more sub-regions into a mesh region is carried out in the following manner conceptually. $n_1(=1)$ horizontal subdivisions from the left subdivided in the horizontal direction (i.e., sub-regions A, F, K, P and U) are converted into first integrated horizontal subdivisions and a pair of coordinates IT(1) and IT(2) is stored into the mesh region table 7. $n_2$ horizontal subdivisions from the subdividing position coordinate which is $n_{12}$ before (or to the left of) the subdividing position coordinate IT(2) are converted into second integrated horizontal subdivisions. Here, since $n_{12}=0$ and $n_2=2$, the sub-regions B, G, L, Q, V, C, H, M, R and W are integrated into a second set of horizontal subdivisions which does not overlap with the first set of horizontal subdivisions. And, then, a pair of coordinates IT(2) and IT(4) is stored into the mesh region table 7. Then, $n_3$ horizontal subdivisions from the subdividing position coordinate which is $n_{23}$ before (or to the left of) the subdividing position coordinate IT(4) are converted into third integrated horizontal subdivisions. Here, since $n_{23}=1$ and $n_3=2$, the sub-regions C, H, M, R, W, D, I, N, S and X are integrated into a third set of horizontal subdivisions which overlaps with the second horizontal subdivisions.

And, a pair of coordinates IT(3) and IT(5) is stored into the mesh region table 7. Similarly, subdivisions including E, J, O, T and Y are converted into a fourth set of integrated subdivisions so that a pair of coordinates IT(2) and IT(6) is stored into the mesh region table 7.

Similarly, integration or combination is carried out also for the vertical subdivisions, and, as a result, pairs of coordinates JT(1) and JT(2), JT(2) and JT(4), JT(3) and JT(5) and JT(5) and JT(6) are stored into the mesh region table 7, respectively. In this manner, the information of subdividing positions of mesh regions 1 through 16 shown in FIG. 1a is stored in the mesh region table 7. That is, here, sub-region A is allotted to mesh region 1 with sub-regions B and C being allotted to mesh region 2 and sub-regions C and B being allotted to mesh region 3. The sub-regions C is commonly allotted to the mesh regions 2 and 3, and, thus, it defines an overlapping portion between these two adjacent mesh regions 2 and 3. In a similar manner, sub-regions F and K are allotted to mesh region 5 and sub-regions K and P are allotted to mesh region 9, so that the sub-region K constitutes an overlapping portion between the resulting two adjacent mesh regions 5 and 9 in the vertical direction. On the other hand, sub-regions G, L, H and M are allotted to mesh region 6 and sub-regions H, M, I and N are allotted to mesh region 7; whereas, sub-regions L, Q, M and R are allotted to mesh region 10 and sub-regions M, R, N and S are allotted to mesh region 11. In other words, the sub-region M is commonly allocated to the four adjacent mesh regions 6, 7, 10 and 11 and thus defines an overlapping portion of these four adjacent mesh regions.

In this manner, mesh regions are formed from the sub-regions, which have been formed by subdividing the character pattern such that predetermined feature quantities (directionality codes in the present example) are distributed substantially uniformly over the sub-regions, by integrating or combining two or more of the sub-regions at least partly. And, an overlapping portion between two or more of the adjacent mesh regions is also defined by such a sub-region. Thus, the particular manner of integration differs depending on the manner and/or degree of deformation even for the same character. As a result, as compared with the prior art case in which no overlapping portion of adjacent mesh regions was provided or the overlapping portion between adjacent mesh regions had a constant overlapping width, the present invention allows to accommodate a broader range of deformations of a character pattern, so that feature extraction of a character pattern can be carried out stably without being adversely affected by its deformations. It is to be noted that the directionality codes have been used as feature quantities in the above-described embodiment; however, the character subdividing method of the present invention can also be carried out by using other various forms of feature quantities, such as the number of black pixels, in consideration of a particular character recognition algorithm used.

Next, with particular reference to FIG. 2 and also to FIGS. 3a(1), 3a(2) and 3b, the character pattern subdividing process in accordance with one embodiment of the present invention will be described more in detail.

Figure 3B:
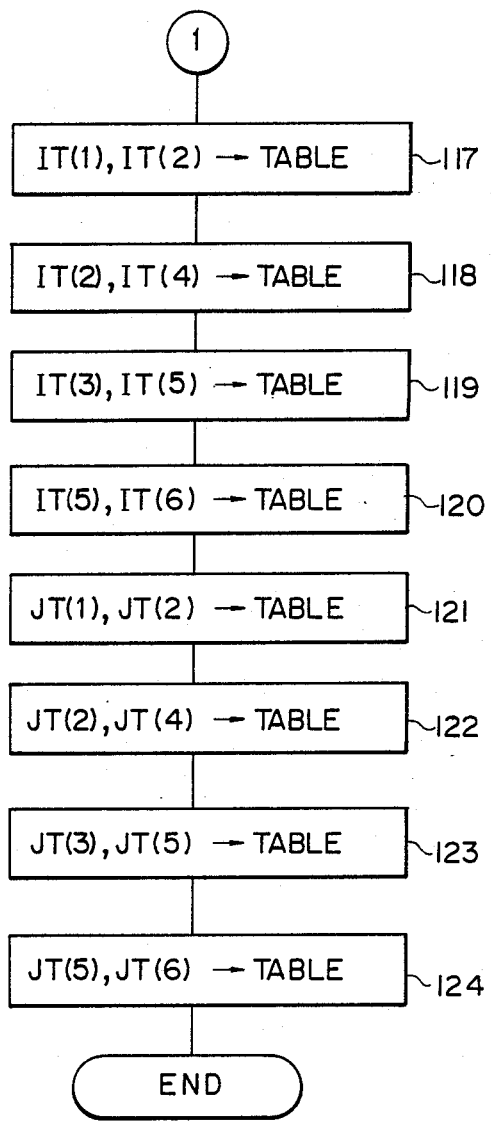
FIG. 3a is an illustration showing how FIGS. 3a(1) and 3a(2) should be combined.

Steps 100 through 116 in the flow chart shown in FIG. 3 correspond to a sequence of steps for subdividing a character pattern into a first plurality of sub-regions. Upon completion of a process for assigning a plurality of predetermined directionality codes to the contour pixels of a character pattern (and also of counting the total number ITOTAL of assigned codes), the microprocessor 1 initiates the process following step 100. In the first place, at step 100, a counter I (an internal register of the microprocessor 1 or a particular address of the memory 2) is cleared, and the counter is incremented by 1 at the next step 101. Then, it is checked whether or not the count of counter I is five (number of subdivisions in the horizontal and vertical directions), and, if not, it proceeds to step 103. At step 103, (ITOTAL X I)/5 is calculated and its result is stored into the memory 2 at address ITO(I). The loop from step 101 to step 103 is repeated until the condition of I=5 is reached.

Here, the value stored at address ITO(I) signifies the number of directionality codes to be contained from the left-hand side (or right-hand side) of the character pattern to the right-hand side (or bottom) of a first set of subdivisions in the horizontal direction (or vertical direction). Upon reaching the condition of I=5, it proceeds to a process starting with step 104. At step 104, registers IT1 and JT1 (internal registers of the microprocessor 1 or particular addresses of the memory 2) are cleared. At step 105, the condition of IT(1)=JT(1)=1 is written into the sub-region table 5, and, then, at step 106, the condition 25 of IT(6)=JT(6)=64 (character size) is written into the sub-region table 5. Then, at step 107, the value of "2" is set in the counters I and J (internal registers of the microprocessor 1 or particular addresses of the memory 2), and a counter K (internal register of the microprocessor 1 or particular address of the memory 2) is cleared. By the process from step 107 to step 116, the coordinates of the subdividing positions in the horizontal and vertical directions are determined. At step 108, the counter K is incremented by 1 and, at the next step 109, it is checked whether or not the count of the counter K has reached the value of "64".

If the count of the counter K has not yet reached the value of "64", then it proceeds to step 110. At step 110, one line in the vertical direction at horizontal coordinate K of the character buffer 4 is scanned, thereby adding the number of directionality codes LINE(1,K) on the line to the value of register IT1, and the result is again set in the register IT1. Then, one line in the horizontal direction at vertical coordinate K is scanned, whereby the number of directionality codes LINE(2,K) thereon is added to the value of the register JT1, and the result is again set in the register JT1. At the next step 111, the value of the register IT1 is compared with the value stored at address ITO(I) of the memory 2, and if the former is larger than the latter, then it goes to the next step 112, where the value of the counter K is written into the sub-region table 5 as subdividing position coordinate IT(I) in the horizontal direction, and, then, the counter I is incremented at step 113 and thereafter it proceeds to step 114. If IT1 is equal to or smaller than IT0(1) as a result of determination at step 111, then the steps 112 and 113 are skipped.

At step 114, the value of the register JT1 is compared with the value at the address IT0(J), and if the former is larger than the latter, then it goes to the next step 115 where the value of the counter K is written into the sub-region table 5 as the subdividing position coordinate JT(J) in the vertical direction. And, then, it goes to step 116 where the counter J is incremented, and, thereafter, it returns to step 108. In this manner, when the character pattern has been subdivided into five sections in the horizontal and vertical directions, the value of the counter K reaches "64", so that it proceeds to step 117 from step 109.

Steps 117 to 124 define a process for converting a first plurality of sub-regions into a second plurality of mesh regions by carrying out integration of some of the sub-regions in accordance with the contents stored in the allotment table 6, as described with reference to FIGS. 1a and 1b previously. That is, during this process, the subdividing position information of the mesh regions, or subdividing position coordinates of converted or integrated subdivisions in the horizontal and vertical directions, is read out of the sub-region table 5 and written into the mesh region table 7.

In an alternative structure, the allotment table 6 may be stored in a read only memory or ROM; however, if the allotment table 6 is stored in a RAM as in the above-described embodiment, the rules of integration of combination of sub-regions can be easily altered by merely altering the contents stored therein. For example, when use is made of a RAM, the allotment table 6 may be rewritten corresponding to the kind of a character of a character species.

Another embodiment of the present invention will now be described. In the above-described embodiment, integration or combination of sub-regions is carried out in accordance the contents of the allotment table 6. On the other hand, in the present embodiment, integration or combination of sub-regions is carried out in accordance with a rule determined by a particular equation without using a allotment table.

Figure 5A:
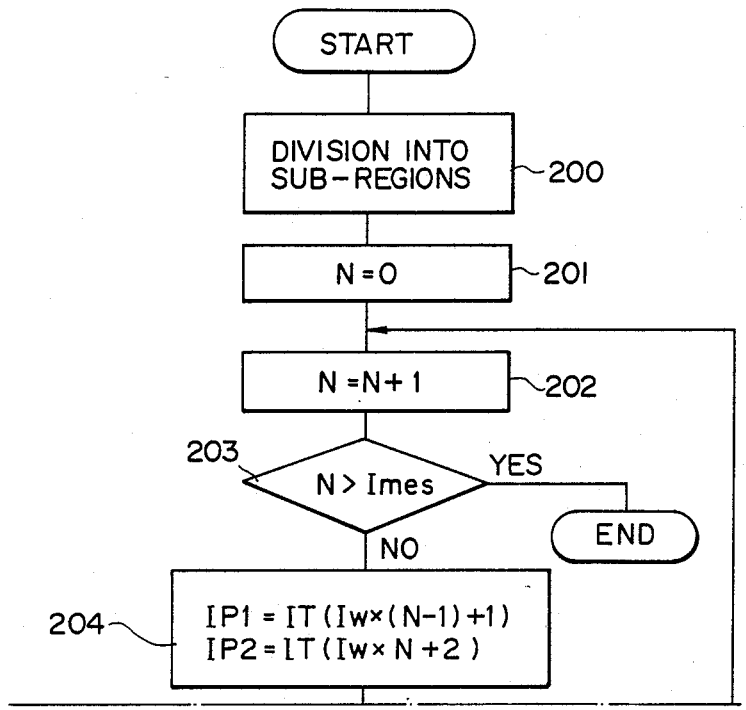
FIGS. 5a and 5b, when combined as illustrated in FIG. 5, define a flow chart showing a sequence of steps for implementing the character pattern subdividing method illustrated in FIG. 4.
Figure 5:
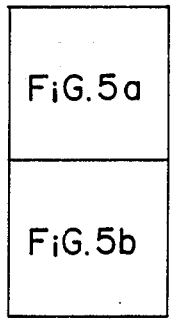
FIG. 5 is an illustration showing how to combine FIGS. 5a and 5b.
Figure 5B:
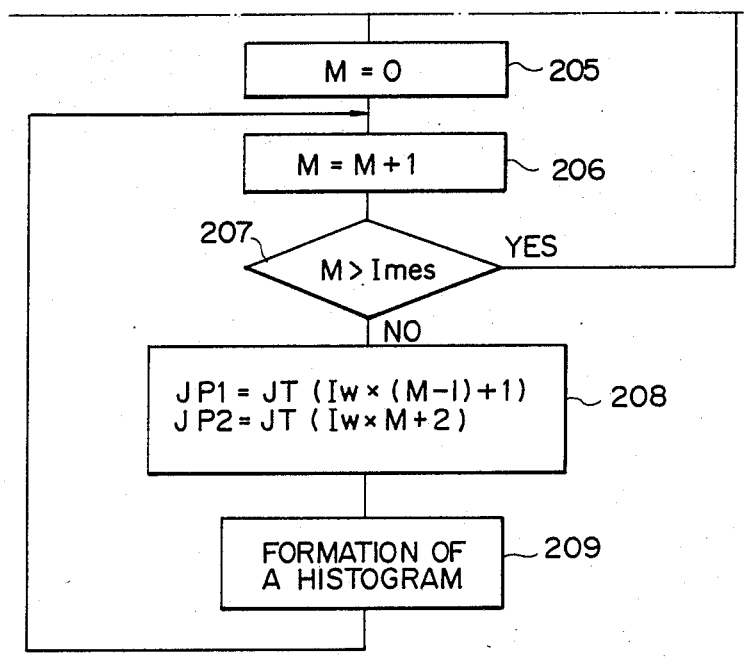

FIGS. 5a and 5b illustrate a flow chart showing a sequence of steps defining a process for subdividing a character pattern into mesh regions in accordance with this second embodiment of the present invention. It is to be noted, however, that steps 200 in this flow chart includes the same set of steps corresponding to steps 100 to 116 shown in FIG. 3. In addition, step 209 corresponds to a step for carrying out a process of extracting features of a character pattern of each of the mesh regions, such as formation of histograms of directionality codes as disclosed, for example, in the Japanese Patent Application No. 59-202825 assigned to the assignee of this application. It should also be noted that the process of this second embodiment can be carried out by using the system shown in FIG. 2.

With reference to FIGS. 5a and 5b, the mesh region subdividing process will be described below. After subdividing a character pattern into 5×5 sub-regions at step 200, an integration or combination processing of the sub-regions starts. At step 201, the counter N for the number of subdivisions in the horizontal direction is cleared, and then the counter N is incremented by "1" at step 202. Then, at step 203, the value of the counter N is compared with the number of subdivisions of mesh regions in the vertical direction Imes. If N is equal to or less than Imes, then it proceeds to step 204 where the horizontal subdivision position coordinate (coordinate determined by the sub-region subdivision process) corresponding to IW X (N−1)+1 is set in the register IP1. In addition, the horizontal subdivision position coordinate (coordinate determined by the sub-region subdivision process) corresponding to IW X N+2 is set in the register IP2.

Here, IW=(Idev+Imes−1)/Imes−1, where Idev is the number of subdivisions of sub-regions in the horizontal and vertical directions. It is, however, selected to hold the relation of Idev=C X Imes+1 (C=1, 2, 3, ...).

Then, it goes to step 205 where the counter M for the number of subdivisions in the vertical direction is cleared. Then, at step 206, the counter M is incremented by "1", and the value of the counter M is compared with Imes at step 207. If M is equal to or less than Imes, then it goes to step 208 where the horizontal subdivision position coordinate (coordinate determined by the sub-region subdivision processing) corresponding to Iw X (m−1)+1 is set in the register JP1. In addition, the horizontal subdivision position coordinate (coordinate determined by the sub-region subdivision processing) corresponding to Iw X M+2 is set in the register LP2. With this, one mesh region is determined, and the coordinate of its start point (top left corner of the mesh region) is designated by the contents of the registers IP1 and JP1 and the coordinate of its end point (bottom right corner of the mesh region) is designated by the contents of the registers IP2 and JP2. For the single mesh region determined in this manner, a histogram of directionality codes is formed at step 209. Upon completion of step 209, it goes back to step 206 so that the next mesh region in the same horizontal position is determined. Upon completion of determination of all of the mesh regions at the same horizontal position and thus of formation of a directionality histogram, the condition of M being larger than Imes is satisfied at step 207, so that it goes back to step 202, thereby initiating a process to determine a mesh region shifted in position by one in the horizontal direction. Upon completion of determination of all of the mesh regions, since the condition of N being larger than Imes is satisfied at step 203, the process is terminated.

Figure 4:
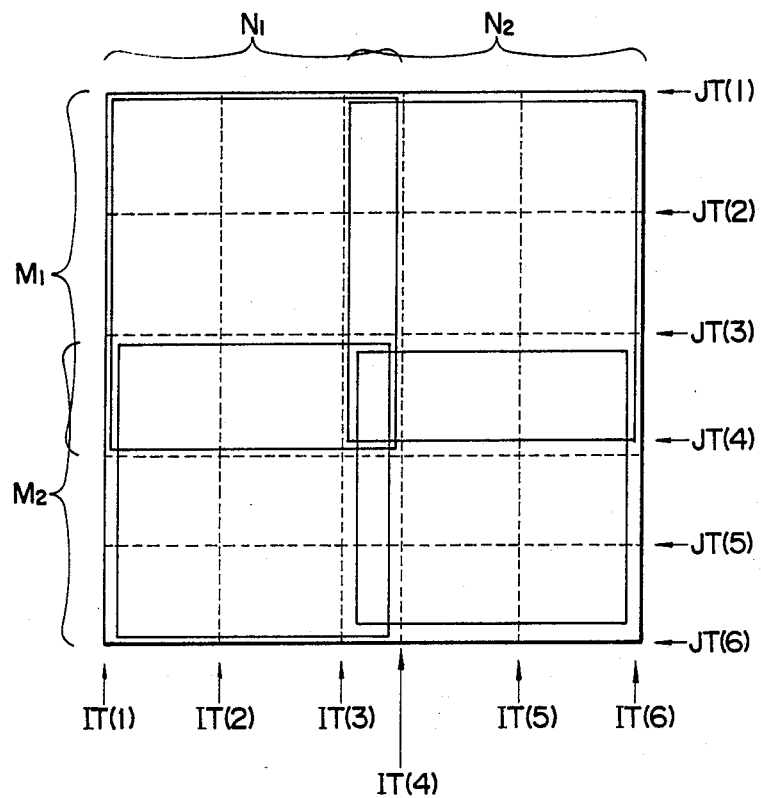
FIG. 4 is an illustration showing a character pattern subdividing method in accordance with another embodiment of the present invention.

It is to be noted that it may also be so structured to carry out only the mesh region subdividing process while omitting the step 209 for formation of a directionality histogram. In this second embodiment, the result of mesh subdivision with Idev=5 and Imes=2 (thus Iw=2) is illustrated in FIG. 4, in which the dotted lines indicate demarcation lines of sub-regions and the solid lines indicate demarcation lines of mesh regions formed from the sub-regions by partial integration or combination of the sub-regions. Also in this embodiment, since the manner of subdivision of mesh regions and an overlapping portion of some of the mesh regions vary depending on the manner or degree of deformation of a character pattern, deformations of a character pattern are sufficiently absorbed and thus feature extraction of a character pattern can be carried out stably at all times, thereby contributing to maintain a high rate of character recognition for any kind of a character with or without deformations, as in the previously described embodiment.

Figure 6:
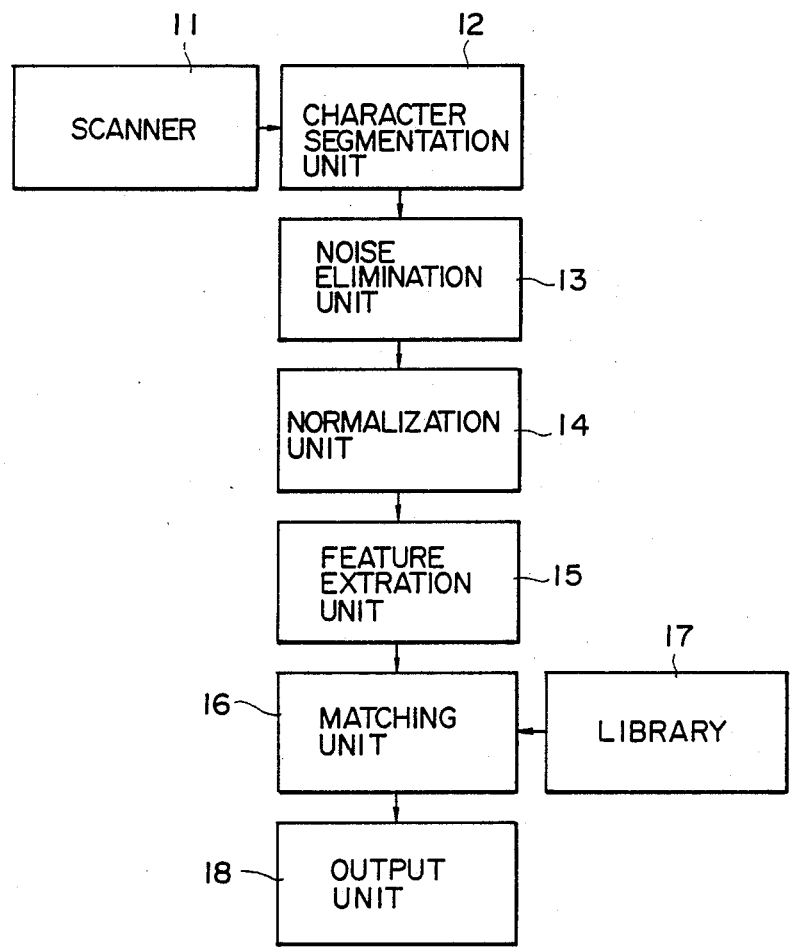
FIG. 6 is a block diagram showing an optical character recognition system constructed in accordance with a further embodiment of the present invention.
Figure 7A:
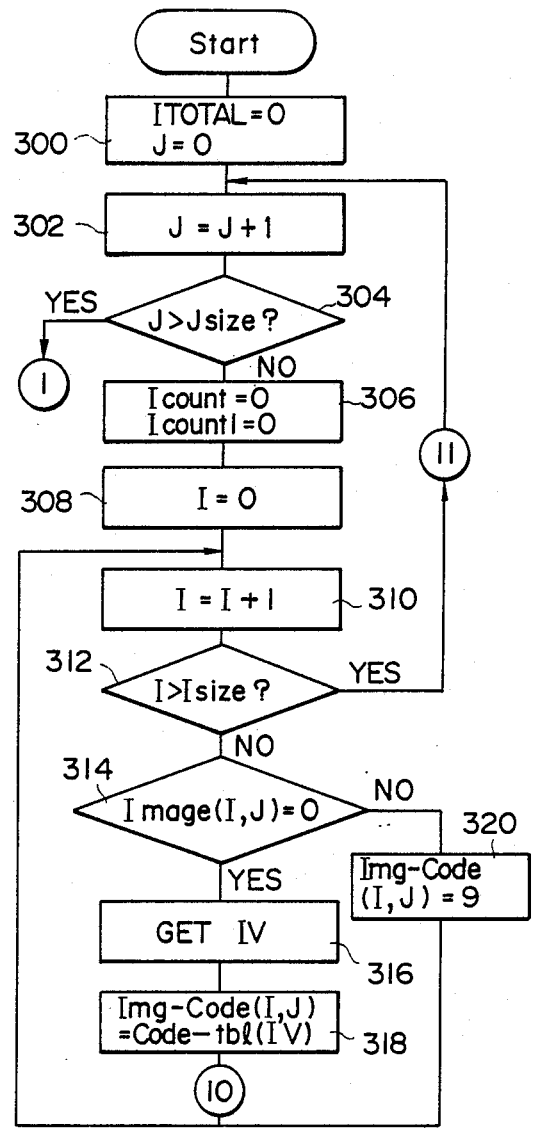
FIGS. 7a through 7f define a flow chart showing a sequence of steps to be carried out at the feature extraction unit 15 of the system shown in FIG. 6.
Figure 7B:
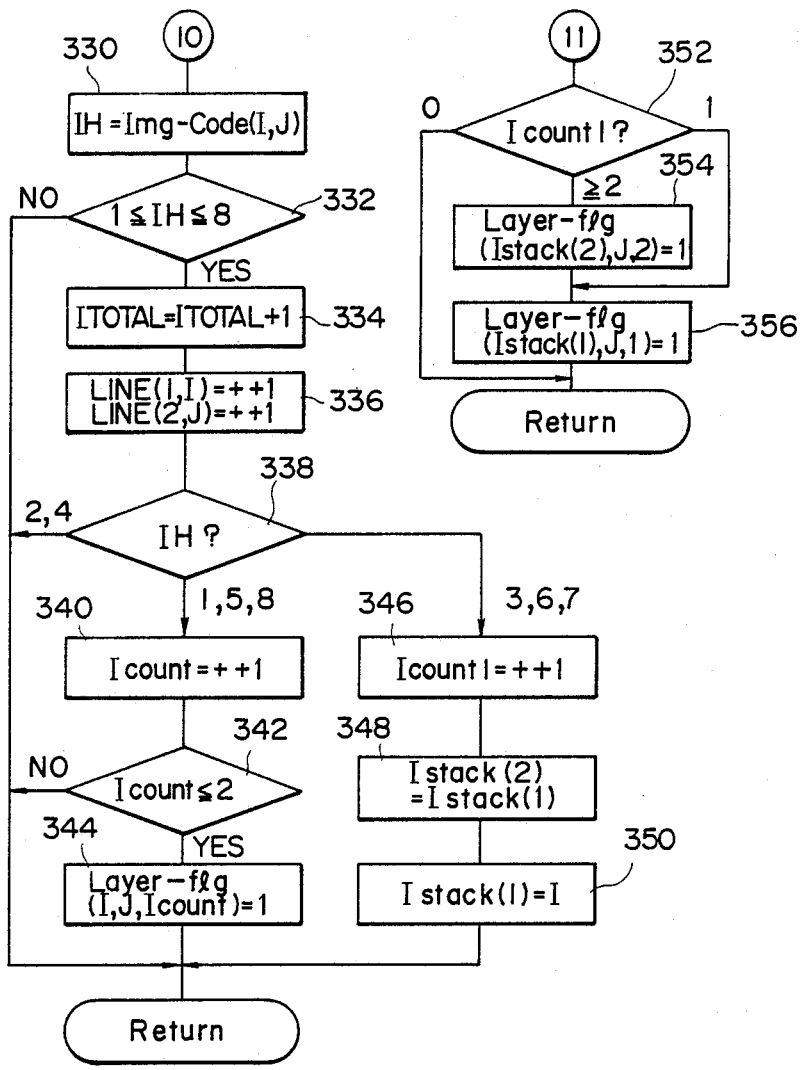
Figure 7C:
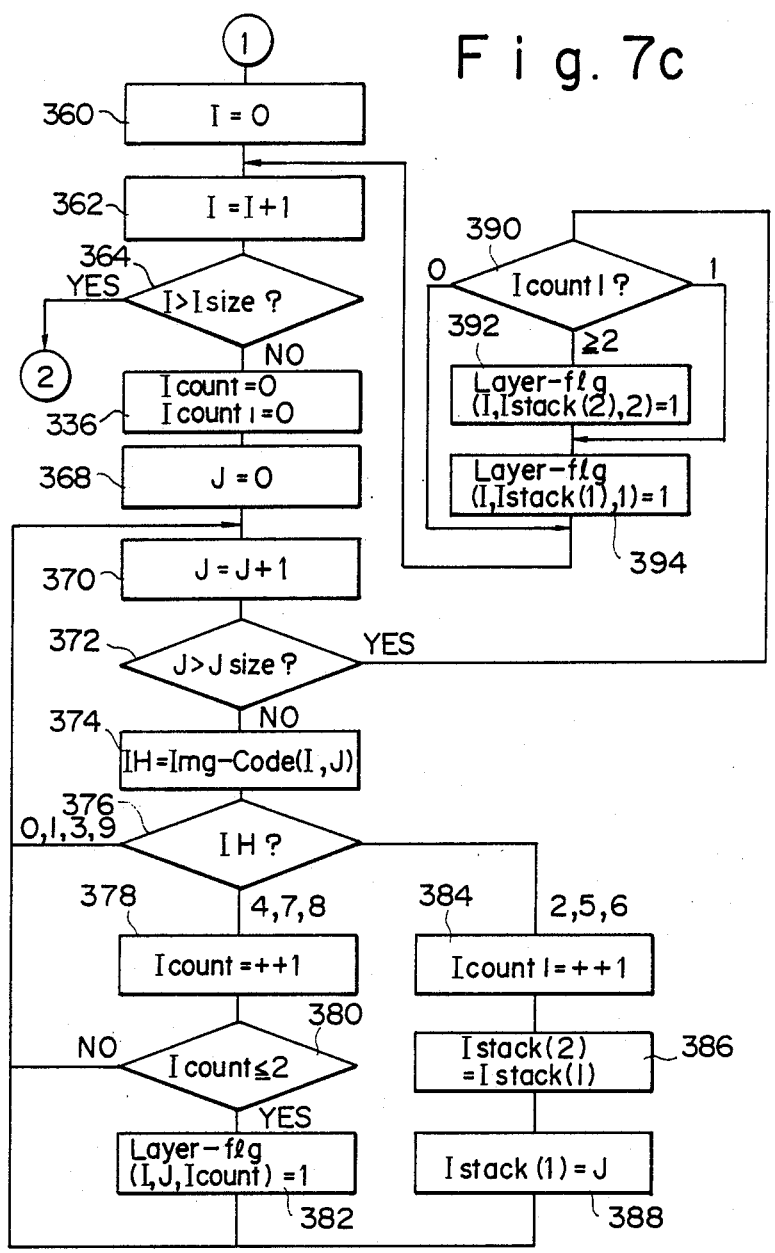
Figure 7D:
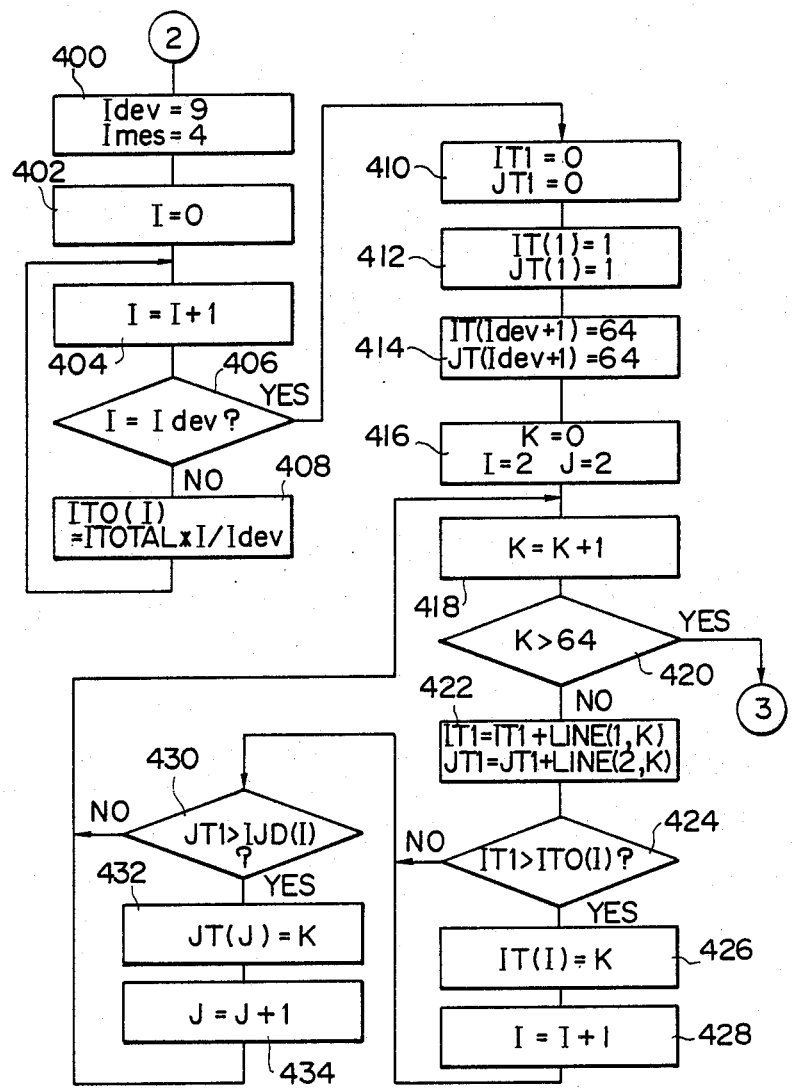
Figure 7E:
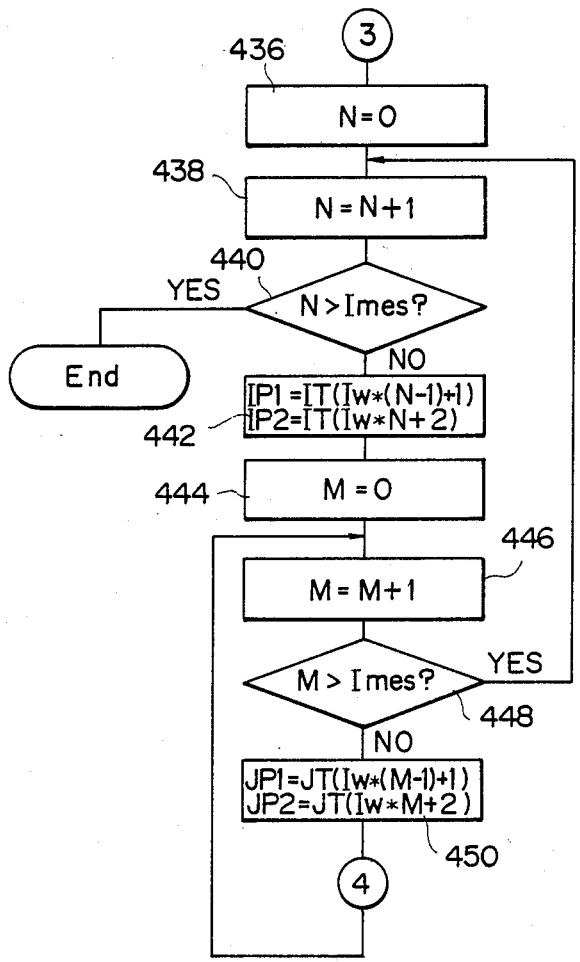
Figure 7F:
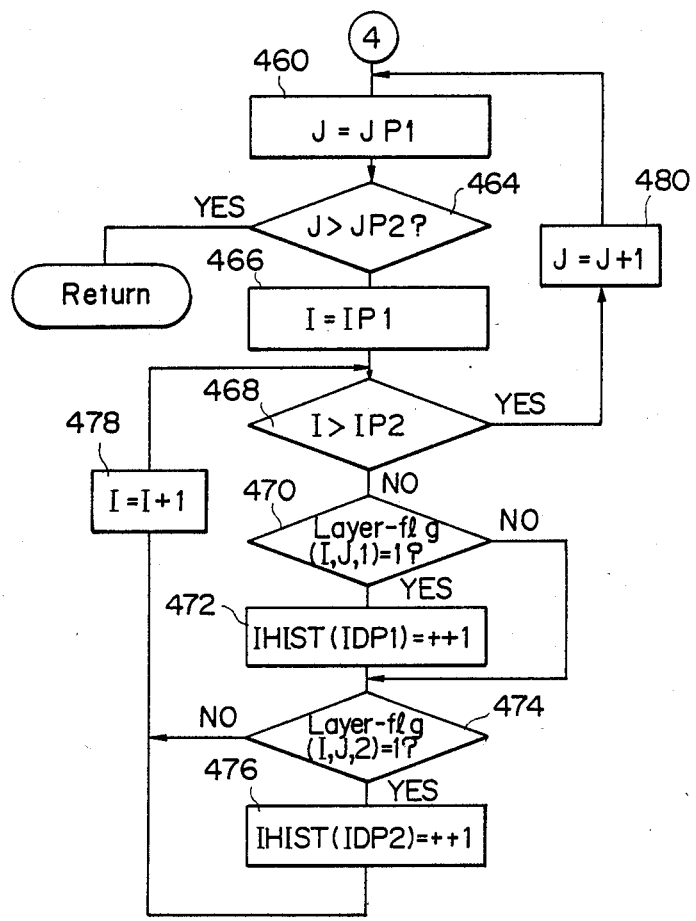

Referring now to FIG. 6, there is shown in block form an optical character recognition system constructed in accordance with a further embodiment of the present invention. As shown, the present system includes a scanner 11 for optically reading an original image, thereby converting an optical image information into an electrical binary image signal which is supplied to a character segmentation unit 12 where individual character patterns are separated from the binary image signal. Such a segmented individual character pattern is then supplied to a noise elimination unit 13 where noise components are eliminated. Then, the character pattern is supplied to a normalization unit 14 and then to a feature extraction unit 15. At the feature extraction unit 15, feature extraction from the character pattern thus input carried out according to the so-called multi-layer directionality code histogram method, and, then, feature vectors thus extracted are supplied to a matching unit 16, where a distance calculation between the feature vectors thus supplied and the feature vectors stored in a library 17 for known character patterns is carried out, thereby supplying a code of a known character having a minimum calculated distance to an output unit 18.

The process carried out at the feature extraction unit 15 will now be described in detail below with particular reference to FIGS. 7a through 7f which define a flow chart showing a sequence of steps of this process. It is to be noted that the feature extraction unit 15 may have a hardware structure constructed by a microprocessor, a memory and the like, wherein the microprocessor executes a predetermined process in accordance with a predetermined program stored on the memory. It should also be noted that such items as counters, flags and tables which will be mentioned in the following description may be implemented as particular addresses or memory areas of the memory.

The process at this feature extraction unit 15 may be generally divided into a sub-process of assigning a plurality of predetermined directionality codes as shown in FIG. 8 to the white pixels defining the contour of a character line of a character pattern (stored on a specific region of the memory); a sub-process for classifying the assigned directionality codes (assigned to the white pixels defining the contour of a character line) into different layers; a sub-process for subdividing the character pattern into mesh regions; and a sub-process for forming a directionality code histogram for each of the layers for each of the mesh regions. Now, each of these sub-processes will be described in detail with reference to FIGS. 7a through 7f.

At step 300, directionality code number counter ITOTAL and address counter J are reset, and, then, a substantial process is initiated at step 302. In the first place, the directionality code assigning sub-process will be described. In accordance with this directionality code assigning sub-process, the input character pattern is scanned from left to right in the horizontal direction, during which access is made to a directionality code table based on an address value determined by a pattern of four pixels arranged top and bottom and right and left of a white pixel of interest, and a directionality code read out of the table is written into the pattern in the directionality code assigned pattern memory area on the memory corresponding to the pixel of interest. That is, at step 302, an address counter J for designating the scanning address of the character pattern in the vertical direction is incremented, and at step 304, the count of the address counter J is compared with a size Jsize of the character pattern in the vertical direction. If J is equal to or less than Jsize, since it indicates the middle of scanning, it proceeds to step 306 where layer classification counter Icount and reversed direction layer classification counter Icount1, which are related to the later-described layer classification, are reset.

Then, it goes to step 308 where a counter I for designating the scanning address in the horizontal direction is reset, which is followed by step 310 for incrementing the counter I. At step 312, a comparison between the counter I and Isize of the character pattern in the horizontal direction is carried out. If I is larger than Isize, then since it indicates the completion of scanning of a scanning line of the current address J, it returns to step 302 after going through routine 11 for the later-described layer classification sub-process, so that it proceeds to scanning of the next scanning line. At step 312, if I has been determined to be equal to or less than Isize, then it is checked whether or not data Image(I,J) of address (I,J) of the input character pattern is "0" (white pixel). If not "0", since its pixel is a black pixel (data being "1"), it goes to step 320, where code 9 is written into the corresponding address in the directionality code assigned character pattern memory area as data Imag-Code (I,J). If data of Image(I,J) is "0" (white pixel), then it goes to step 316 where the data of right pixel (A), top pixel (B), left pixel (C) and bottom pixel (D) around its pixel of interest are read out of the input character pattern memory area, thereby calculating $IV = A + 2B + 4C + 8D$.

Then, it goes to the next step 318 where the memory data Code-tb1(IV) of the directionality code table is read out with IV as address information, and this data (directionality code) is written into the corresponding address of the directionality code assigned character pattern memory area as data Code-tb1. Then, it goes back to step 310 after going through a routine 10 for layer classification, and then it proceeds to scanning of the next scanning line. Upon completion of the entire horizontal scanning, the conditions at step 304 are satisfied, thereby terminating the directionality code assigning processing and then proceeding to routine 1 for layer classification processing.

It is to be noted that ten different directionality codes and their associated pixel patterns are shown in FIG. 8. As shown, each associated pixel pattern is comprised of five pixels, including a center pixel, which is a pixel of interest, a pair of top and bottom pixels and a pair of right and left pixels. In the table shown in FIG. 8, the pixel of interest which is located at the center of each pattern is a white pixel and this pixel of interest is compared with each of the white pixels located along the contour of a character pattern, and a corresponding directionality code is assigned to each of the white contour pixels by comparison with the pixel pattern in the table of FIG. 8. It should be noted that valid directionality codes are from 1 through 8.

Now, the layer classification processing will be described in detail below. In accordance with the principle of this layer classification processing, the directionality code assigned character pattern is scanned vertically from top to bottom and then horizontally from left to right, and then further scanning is carried out by reversing the directions. And, in each scanning line, the directionality code appearing following one or more white pixels (0) is detected, and if the directionality code thus detected is the first directionality code detected in the scanning line, then it is classified into a first layer. On the other hand, if the directionality code detected is the second directionality code detected in the scanning line, then it is classified into a second layer. In this manner, all of the directionality codes detected along a single scanning line are classified into different layers depending on the order of detection along the scanning line. Such a layer classification method is disclosed in the Japanese Patent Application No. 59-22822, which has been assigned to the assignee of this application and thus hereby incorporated by reference. It is to be noted, however, that the present embodiment slightly differs from the layer classification algorithm disclosed in the above-mentioned patent application because, in the present embodiment, the kind or type of a directionality code is utilized for classification into layers, thereby increasing the efficiency of the layer classification processing. In addition, it should also be noted that, in the present embodiment, there are only two layers for classification of detected directionality codes.

When routine 10 is called after step 318, at the first step 330 of routine 10, data Img-Code (I,J) in the directionality code assigned character pattern memory area is transferred to register IH. Then, at the next step 332, it is checked whether or not the data in the register IH is a valid directionality code "1" through "8". If not a valid directionality code (i.e., code "0" or "9"), then it goes back to step 310. On the other hand, if it is a valid directionality code, then it proceeds to step 334 to increment counter ITOTAL by "1". It then proceeds to step 336 where a horizontal directionality code number row counter LINE (1,I) in the horizontal direction and a vertical directionality code number row counter LINE (2,J) are incremented by "1". Then, it proceeds to step 338 to examine the kind of its directionality code (IH). If the directionality code is "2" or "4", then it proceeds to return step. On the other hand, if the directionality code is "1", "5" or "8", then it proceeds to step 340 where a layer classification counter Icount is incremented, and, then, at the next step 342, it is checked whether or not the count of the counter is equal to "2" or less. If not equal to or less than "2", then it returns to the main routine immediately (because, layer classification is carried out up to the second layer in the present embodiment). On the other hand, if it is equal to or less than "2", then it proceeds to step 344, so that "1" is written into a layer classification flag Layer-flg (I,J,Icount) of the layer indicated by the layer classification counter Icount, and, then, it proceeds to the return step.

If the directionality code read out into the register IH is "3", "6", or "7", then it proceeds to step 346 so that a reversed direction layer classification counter Icount1 for scanning vertically from bottom to top and horizontally from right to left is incremented. Then, at the next step 348, the contents of a layer flag stacker Istack(1) are written into a reversed direction layer flag stacker Istack(2). And, then, it proceeds to step 350 where the count of the address counter I is written into the layer flag stacker Istack(1), and, then, it proceeds to the return step. Every time when the processing of assignment of directionality codes is completed for one scanning line, a routine 11 is called. In this routine, at step 352, the count of the reversed direction layer classification counter Icount1 is examined. If the count is "0", then it immediately proceeds to the return step. However, if the count is equal to "2" or more, then, at step 354, "1" is set in the second layer flag Layer-flg (Istack(2), J, 2) corresponding to the value of the normal direction layer classification flag stacker Istack(1), and, thereafter, it proceeds to the return step. If the count of the reversed direction layer classification counter Icount1 is "1", the step 354 is skipped, so that it proceeds to step 356 and then to the return step.

In this manner, the layer classification processing by scanning in the horizontal direction is carried out. And, the layer classification processing by scanning in the vertical direction is carried out by the routine 1. In the routine 1, after the address counter I has been reset at step 360, the substantial layer classification processing is initiated. That is, at step 362, the address counter I is incremented, and, then, its count is compared with size Isize in the horizontal direction of the character pattern. If I is larger than Isize, then the processing is terminated and then it proceeds to a routine 2 for mesh region subdivision and histogram formation. On the other hand, if I is not larger than Isize, it proceeds to step 366 where the layer classification counter Icount for the scanning direction from top to bottom (positive direction) and the layer classification counter Icount1 for the scanning direction from bottom to top (reversed direction) are reset.

At step 370, the address counter J is reset, and, then, at the next step 370, the address counter J is incremented At step 372, the count of the address counter J is compared with the vertical size Jsize of the character pattern in the vertical direction. If J is equal to or smaller than Jsize, then memory data Img-Code (I,J) in the directionality code assigned character pattern memory area is read out to the register IH. At step 376, the kind of the data (directionality code) of the register IH is examined. If that data is "0", "1", "3", or "9", then it goes back to step 370. On the other hand, if that data is "4", "7", or "8", then it proceeds to step 378, so that the layer classification counter Icount is incremented, and, then, at the next step 380, it is checked whether or not the count of that counter is equal to "2" or smaller. If not equal to or smaller than "2", then it goes back to step 370 (because layer classification is carried out up to the second layer in the present embodiment). On the other hand, if equal to or less than "2", then it goes to step 380 where "1" is written into the layer classification flag Layer-flg (I, J, Icount) of the layer indicated by the layer classification counter Icount, and, thereafter, it goes back to step 370.

If the directionality code read out of the register IH is "2", "5", or "6", then it proceeds to step 384 where the reversed direction layer classification counter Icount1 is incremented. Then, at the next step 386, the contents of the layer flag stack Istack(1) are written into the reversed direction layer flag stack Istack(2). And, then, it goes to step 388 where the value of the address register I is written into the layer flag stack Istack(1), and, thereafter, it goes back to step 370. Each time when the layer classification processing for one scanning line in the vertical direction has been completed, the conditions at step 372 are satisfied, so that it proceeds to step 390. At this step 390, the count of the reversed direction layer classification counter Icount1 is checked. If that count is "0", then it immediately goes back to step 362, thereby carrying out the processing for the next scanning line. On the other hand, if that count is equal to or larger than "2", then it proceeds to step 392 where "1" is set in the layer classification flag Layer-flg (Istack(2), j, 2) of the second layer corresponding to the value of the reversed direction layer flag stacker Istack(2), and, then, at step 394, "1" is set in the layer classification flag Layer-flg (Istack(1), j, 1) of the first layer corresponding to the value of the positive direction layer classification flag stacker Istack(1), and, thereafter, it goes back to step 362. If the value of the reversed direction layer classification counter Icount1 is "1", then the step 392 is skipped and it proceeds to step 394 and then back to step 362.

Figure 9:
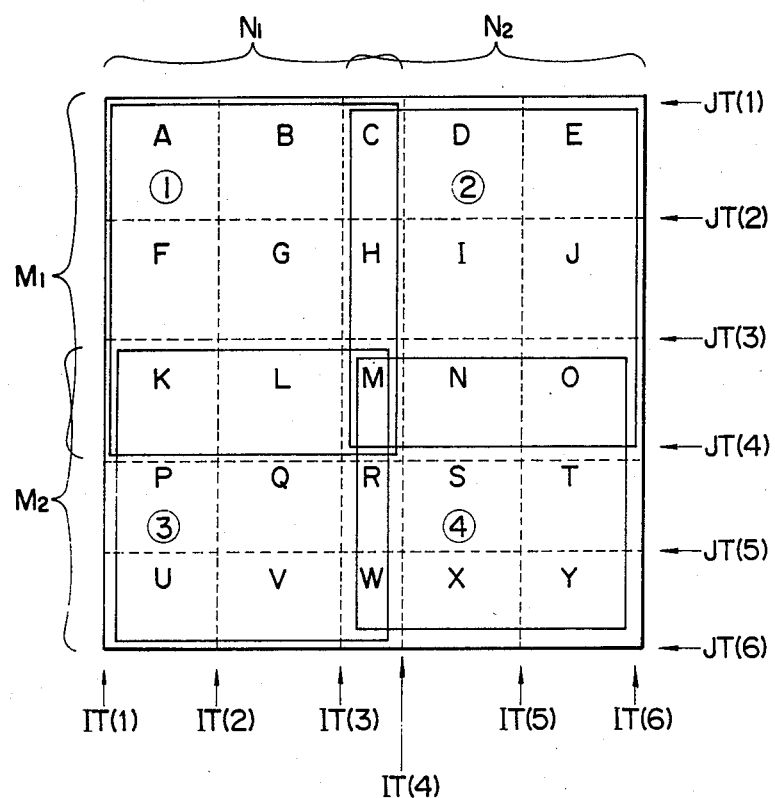
FIG. 9 is an illustration which is useful for explaining a character pattern subdividing method applied to the system of FIG. 6.

In this manner, the layer classification processing by scanning in the vertical direction is carried out. Upon completion of this processing, the conditions of step 364 are satisfied, so that it proceeds to the routine 2 for mesh region subdivision and histogram formation. Steps 402 through 434 of the routine 2 define a subdivision process for subdividing the character pattern into a plurality of sub-regions such that the assigned directionality codes are distributed substantially uniformly among the sub-regions. FIG. 9 is an illustration useful for explaining a subdivision process for subdividing the character pattern into a first plurality of sub-regions and an integration or combination process for converting the first plurality of sub-regions into a second plurality of mesh regions by combining at least some of the sub-regions according to a predetermined rule.

In the first place, the number of subdivisions Idev for subdividing the character pattern horizontally and vertically into sub-regions and the number of mesh divisions Imes in the vertical and horizontal directions are set at step 400. In the present embodiment, since Idev=5, the character regions is subdivided into 5×5=25 sub-regions. In addition, since Imes=2, the sub-regions are partially combined to define 2×2=4 mesh regions. It is to be noted that the character pattern is assumed to have a pattern of 64×64 pixels.

At step 402, the counter I is cleared, and, then, at the next step 404, the counter I is incremented by "1". Then, it is checked whether or not the count of counter I is equal to Idev (number of subdivisions in the horizontal and vertical directions), and if not, it proceeds to step 408. At step 408, (ITOTAL X I)/Idev is calculated, and its calculated value is written into a register ITO(I). Here, ITOTAL (count of directionality code number counter ITOTAL) indicates the total number of the directionality codes assigned to the character pattern up to this processing. The loop including steps 404 through 408 is repeated until the condition of I=Idev=5 is obtained. Here, the value of the register ITO(I) indicates the number of directionality codes which are contained between the left side (or right side) of the character pattern and the right side (bottom side) of the Ith subdivided region in the horizontal direction (or vertical direction).

If the condition of I=5 has been obtained, then it proceeds to a processing starting with step 410. At step 410, registers IT1 and JT1 are cleared. At the next step 412, "1" is set for registers IT(1) and JT(1), and, then, at the next step 414, "64" (character size) is set in the registers IT(6) and JT(6). Then, at step 416, "2" is set in the counters I and J and the counter K is cleared. From step 416 to step 434, the character pattern subdividing position coordinates in the horizontal and vertical directions for subdividing the character pattern into a first plurality of sub-regions are determined. At step 418, the counter K is incremented by "1" and at the next step of 420 it is checked whether or not the count of counter K has reached the value of 64. If K has not reached the value of 64, then it proceeds to step 422. At this step 422, the directionality code assigned character pattern is scanned along a vertical line at the horizontal coordinate being equal to K, whereby the number of directionality codes LINE(1,K) on that vertical scanning line is added to the value of the register IT1, and the added value is set in the register IT1. In addition, the character pattern is also scanned along a horizontal line at the vertical coordinate being equal to K, whereby the number of directionality codes LINE(2,K) on that horizontal scanning line is added to the value of the register JT1, and the added value is set in the register JT1.

At the next step 424, the value of the register IT1 is compared with the value of the register ITO(I), and if the former is larger than the latter, it proceeds to step 426 where the value of counter K is set in the register IT(1) for the subdividing position coordinate in the horizontal direction, and, then, at step 428, the counter I is incremented, which is followed by the next step 430. At step 424, if the condition of IT1 being equal to or smaller than ITO(I) is not satisfied, steps 426 and 428 are skipped. At step 430, the value of the register JT1 is compared with the value of the register IJ0(J), and if the former is larger than the latter, it proceeds to step 432 where the count of counter K is set in the register JT(J) for the subdividing position coordinate in the vertical direction. Then, it proceeds to step 432, thereby incrementing the counter J, and then back to step 418.

In this manner, the character pattern is divided into five vertical sections along the horizontal direction at the positions indicated by the registers IT(2) through IT(5) and moreover into five horizontal sections along the vertical directions at the positions indicated by the registers JT(2) through JT(5). As a result, the character pattern is first subdivided into a first plurality (5×5=25 in the present example) of sub-regions A through Y as shown in FIG. 9 by dotted lines. Upon completion of such subdivisions into sub-regions, since the count of counter K reaches the value of 64, it proceeds from step 420 to step 436. Steps 436 through 450 define a process for integrating or combining at least some of the sub-regions in accordance with a predetermined rule, thereby converting a first plurality of sub-regions into a second plurality (2×2=4 in the present example) of mesh regions.

At step 436, the horizontal subdivision number counter N is cleared and then it proceeds to step 438 where the counter N is incremented by "1". At step 440, the count of counter N is compared with the horizontal or vertical mesh region subdivision number Imes (=2 in the present example). As a result, if it has been found that N is equal to or smaller than Imes, then it proceeds to step 424 where the horizontal subdivision position coordinate (i.e., coordinate determined by the subdivision processing into sub-regions) corresponding to Iw X (N−1)+1 is set in the register IP1. In addition, the horizontal subdivision position coordinate (i.e., coordinate determined by the subdivision processing into sub-regions) corresponding to Iw X N+2 is set in the register IP2. Here, it is to be noted that Iw=(Idev+Imes−1)/Imes−1. It should also be noted that selection is made to satisfy the condition of Idev=C X Imes+1 (C=1, 2, 3, ...).

Then, at step 444, the counter M for the number of divisions in the vertical direction is cleared. At step 446, the counter M is incremented by "1", and, then, at step 448, the count of counter M is compared with Imes. If is equal to or less than Imes, then it proceeds to step 450 where the vertical division position coordinate (i.e., coordinate determined by the subdivision processing into sub-regions) corresponding to Iw X (M−1)+1 is set in the register JP1. In addition, the horizontal division position coordinate (i.e., coordinate determined by the subdivision processing into sub-regions) corresponding to Iw X M+2 is set in the register JP2. As a result, there is defined one mesh region, and the coordinate of its start point (i.e., top left corner of the mesh region thus defined) is designated by the contents of the registers IP1 and JP1 and the coordinate of its end point (i.e., bottom right corner of the mesh region thus defined) is designated by the contents of the registers IP2 and JP2.

For a single mesh region thus defined, a histogram of directionality codes is formed by a routine 4. Upon completion of this processing, it goes back to step 446 and then determination of the next mesh region at the same horizontal position is carried out. Upon completion of determination of all of the mesh regions at the same horizontal position and of formation of directionality code histograms, the condition of M being larger than Imes is satisfied at step 448, so that it goes back to step 438, thereby initiating a process for determining another mesh region shifted in the horizontal direction by one mesh region. Upon completion of determination of all of the mesh regions, the condition of N being larger than Imes is satisfied at step 440, so that the process is terminated.

In this manner, the sub-regions are integrated or combined at least partly into 2×2 mesh regions as indicated by the solid lines in FIG. 9. That is, the character pattern is ultimately divided into 2×2 mesh regions. As is obvious from FIG. 9, sub-regions A, B, C, F, G, H, K, L and M are integrated into mesh region 1; sub-regions C, D, E, H, I, J, M, N and O are combined into mesh region 2; sub-regions K, L, M, P, Q, R, U, V and W are integrated into mesh region 3; and sub-regions M, N, O, R, S, T, W, X and Y are integrated into mesh region 4. And, common sub-regions between the two adjacent mesh regions define an overlapping portion. In the illustrated embodiment, the overlapping portion is defined by sub-regions C, H, M, R, W, K, L, N and O.

In this manner, the mesh regions are formed by appropriately combining at least some of the sub-regions which have been defined by subdividing the character pattern such that the assigned directionality codes (feature quantities) are distributed uniformly among the sub-regions. The overlapping portion of the mesh regions is also comprised of selected ones of the sub-regions and it varies depending on the manner and degree of deformation of character pattern. As a result, as compared with the case having no overlapping portion and the case having a constant overlapping portion, fluctuations due to the manner and degree of deformations of character pattern can be absorbed securely, thereby permitting to process feature quantities of the character pattern stably.

The so-called multi-layer directionality code histogram method is essentially effective against character pattern deformations and allows to obtain a high recognition rate for deformed characters, such as hand-written kanjis, with a minimum library capacity. However, in accordance with the present embodiment, since the character pattern is divided finally into mesh regions as described above, the processing of feature quantities is stabilized, thereby further enhancing the performance against character deformations. Thus, as in the present embodiment, even with feature extraction up to the second layer, a high recognition rate can be achieved, so that the capacity of library can be further reduced.

Now, the processing for formation of a directionality code histogram according to routine 4 will be described in detail below. In this routine 4, a mesh region of interest is scanned, whereby the directionality codes of the pixels for which the layer classification flag of the first or second layer has been set are used to form a layer-classified directionality code histogram of the mesh region of interest by incrementing a histogram counter for each mesh regions, for each directionality code and for each layer.

In the first place, at step 460, the value of register JP1 i.e., vertical coordinate of the top left corner of the mesh region of interest, is set in the register J. Then, at step 464, the value of register JP2, i.e., vertical coordinate of the bottom right corner of the mesh region of interest, is compared with the value of register J. If J is equal to or less than JP2, then it proceeds to step 466. At step 466, the value of register JP1, i.e., horizontal coordinate of the top left corner of the mesh region of interest, is set in the register I. Then, at step 468, the value of register IP, i.e., horizontal coordinate of the bottom right corner of the mesh region of interest, is compared with the value of the register I. And, if I is equal to or smaller than IP2, then it proceeds to step 470. At step 470, it is checked whether or not the layer classification flag Layer-flg (I, J, 1) of the first layer is set to "1". If set to "1", then since the directionality code assigned to the pixel designated by the registers I and J belongs to the first layer, step 472 is carried out. On the other hand, if not set, step 472 is skipped, thereby proceeding to step 474.

At step 472, a first layer histogram counter IHIST-(IDP1) for each mesh region and for each directionality code allocated to a particular address on the memory is incremented. Here, IPO1 is an identification number (corresponding to an address) of the histogram counter, and it is determined by the following equation.

$$IDP1 = 32(M-1) + 8(N-1) + IH$$

Here, M is the value of the before-mentioned counter, i.e., the number of the mesh region in the horizontal direction, and N is the value of the before-mentioned counter N, i.e., the number of the mesh region in the vertical direction. In addition, IH is a data of the before-mentioned register IH, i.e., directionality code. At step 274, it is checked whether or not the layer classification flag Layer-flg (I, J, 2) for the second layer is set. If set, then since the directionality code of the pixel designated by the registers J and J belongs to the second layer, step 276 is carried out; whereas, if not set, step 476 is skipped, thereby proceeding to step 478.

At step 476, the second layer histogram counter IHIST(IDP2) for each directionality code corresponding to a mesh region of interest is incremented. Here, the identification number (corresponding to an address) IDP2 of the histogram counter is determined by the following equation.

$$IDP2 = 128 + 32(M-1) + 8(N-1) + IH$$

Then, at step 478, the register I is incremented to move the scanning position one step below and then it goes back to step 468.

Upon completion of this processing to the bottom end of the mesh region of interest, the conditions at step 468 are satisfied, so that it proceeds to step 480. At step 480, the register J is incremented to move the scanning position by one pixel in the horizontal direction, and, then, it goes back to step 464. Upon completion of the processing to the entire mesh region of interest, the conditions at step 464 are satisfied, so that it moves out of the routine 4 and goes back to step 446 for the routine 3 of mesh region determination. In this manner, a directionality code histogram for each of the first and second layers is formed for each mesh region.

Now, using the layer-classified directionality code histograms thus obtained as components, feature vectors of an input character pattern are extracted and then supplied to the matching unit 16 where matching with the data stored in the library 17 is carried out. The matching is carried out, for example, by calculating a distance between the input character pattern and each of the stored known character patterns stored in the library for each layer. And, then, the code of a known character pattern stored in the library, which has the minimum calculated distance, is supplied to the output unit 18 as the result of recognition for the input character pattern.

A further embodiment of this aspect of the present invention utilizing the so-called multi-layer directionality code histogram method will be described. For example, as an alternative embodiment, when converting a first plurality of sub-regions into a second plurality of mesh regions, it can be carried out in accordance with a rule which is determined by parameters. That is, assuming that the number of subdivisions for subdividing the character pattern into sub-regions in the horizontal or vertical direction and the number of divisions for dividing the character pattern into mesh regions in the horizontal or vertical direction are "5" and "2", respectively, and that the following parameters are given for determining an integration rule.

$n1 = m1 = 1$ $n12 = m12 = 0$ $n2 = m2 = 2$ $n23 = m23 = 1$ $n3 = m3 = 2$ $n34 = m34 = 0$ $n4 = m4 = 1$

It is also assumed that the character pattern has been subdivided into sub-regions as indicated in FIG. 9 by the dotted lines.

In this case, the integration or combination processing of the sub-regions will be carried out in concept as in the following manner. $n1$ (=1) number of horizontally subdivided regions (sub-regions A, F, K, P and U) from the left side of the character pattern are set as first integrated horizontally subdivided regions, and a pair of coordinates IT(1) and IT(2) is written into the mesh region table. Then, $n2$ number of horizontally subdivided regions from a subdividing position coordinate, which is before the subdividing position coordinate IT(2) by $n12$ number of subdivided regions, are set as second integrated horizontally subdivided regions. Here, $n12 = 0$ and $n2 = 2$, so that sub-regions B, G, L, Q, V, C, H, M, R and W are defined as the second integrated horizontally subdivided regions, which do not overlap with the first regions. And, a pair of coordinates IT(2) and IT(4) is written into the mesh region table.

Then, $n3$ number of horizontally subdivided regions from a subdividing position coordinate, which is before the subdividing position coordinate IT(4) by $n23$ number of subdivided regions, are set as third integrated horizontally subdivided regions. Here, $n23 = 1$ and $n3 = 2$, so that sub-regions C, H, M, R, W, D, I, N, S and X are defined as the third integrated horizontally subdivided regions, which overlap with the second horizontally subdivided regions. And, a pair of coordinates IT(3) and IT(5) is written into the mesh region table. Similarly, the remaining sub-regions E, J, O, T and Y are defined as fourth integrated horizontally subdivided regions, and a pair of coordinates IT(2) and IT(6) is written into the mesh region table.

A similar integration operation is also carried out in the vertical direction, and thus pairs of coordinates JT(1) and JT(2), JT(2) and JT(4), JT(3) and JT(5), and JT(5) and JT(6) are respectively written into the mesh region table. In this manner, the mesh region table is given subdivision position information of mesh regions 1 through 10, and based on this information, the sub-regions are appropriately integrated at least partially to define mesh regions 1 through 4 as shown in FIG. 9 by the solid lines. In this manner, when the integration rule is determined by such parameters, a fine control of the number of sub-regions to be integrated into each mesh region and the number of sub-regions to define an overlapping portion between the two adjacent mesh regions can be carried out. In addition, the integration rule can also be designated for each character species.

It is to be noted that feature extraction has been carried out up to the second layer in the above-described embodiment; however, it can be so structured, in general, to carry out feature extraction up to an Nth layer, where N is a positive integer. In this case, it may be so structured to designate the layer number for which a matching distance is calculated for each character. In addition, it may also be so structured to extract features from each layer from the first layer up to the Mth layer and to extract features from a representative layer from the (M+1)th layer to the Nth layer. It should also be noted that the matching calculation can be carried out after rearranging the extracted feature vectors in the order of the magnitude of standard deviation or variance.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A character pattern recognition method comprising the steps of:

optically reading an original image to produce an image signal;

producing an individual input character pattern from said image signal;

extracting a predetermined feature vector from said input character pattern, said extracting step including subdividing said input character pattern into a first plurality of sub-regions in accordance with a first subdivision scheme such that predetermined feature quantities are distributed among the sub-regions substantially equally, and converting said first plurality of sub-regions into a second plurality of mesh regions in accordance with a second subdivision scheme by combining at least some of said first plurality of sub-regions into one or more of said mesh regions; and comparing said feature vector of said input character pattern with each of the feature vectors of a plurality of known character patterns stored in a library, thereby selecting one of said plurality of known character patterns, which is closer to said input character pattern, thereby determining identification of said input character pattern.

2. The method of claim 1, wherein said extracting step includes assigning one of a plurality of predetermined directionality codes to each of pixels defining the contour of said input character pattern and subdividing said character pattern into said first plurality of sub-regions such that said assigned directionality codes are distributed substantially equally over said first plurality of sub-regions.

3. The method of claim 2, wherein each of said plurality of directionality codes corresponds to a particular arrangement of a predetermined number of pixels which includes a center pixel of interest, a first pair of top and bottom pixels located at top and bottom of said center pixel of interest, respectively, and a second pair of right and left pixels located to the right and to the left of said center pixel of interest, respectively.

4. The method of claim 2, wherein said extracting step further includes classifying said assigned directionality codes into one of a predetermined number of layers by scanning said character pattern having said directionality codes assigned to the contour pixels thereof before subdividing said character pattern into said first plurality of sub-regions.

5. The method of claim 4, wherein said scanning of said character pattern is carried out first in a first straight direction, then in a second straight direction normal to said first straight direction, and then reversing directions along said first and second directions, whereby the directionality codes detected during each scanning are classified into said predetermined number of layers in the order of detection one for each layer.

6. The method of claim 10, wherein at least two adjacent ones of said second plurality of mesh regions have a common overlapping region which is defined by a selected one or more of said first plurality of sub-regions.

* * * * *